(12) United States Patent
Kwak et al.

(10) Patent No.: US 10,336,166 B2
(45) Date of Patent: Jul. 2, 2019

(54) DOOR IMPACT BEAM AND MANUFACTURING METHOD THEREOF

(71) Applicants: Hyundai Motor Company, Seoul (KR); Kia Motors Corporation, Seoul (KR); HYUNDAI STEEL COMPANY, Incheon (KR)

(72) Inventors: Dae Hoon Kwak, Gwangmyeong-si (KR); Do Sub Kim, Ulsan (KR); Jeong Ho Lim, Ulsan (KR); Kyung Soo Jin, Ulsan (KR); Baek Gu Kang, Ulsan (KR)

(73) Assignees: Hyundai Motor Company, Seoul (KR); Kia Motors Corporation, Seoul (KR); HYUNDAI STEEL COMPANY, Incheon (KR)

( * ) Notice: Subject to any disclaimer, the term of this patent is extended or adjusted under 35 U.S.C. 154(b) by 38 days.

(21) Appl. No.: 15/708,489

(22) Filed: Sep. 19, 2017

(65) Prior Publication Data
US 2018/0170156 A1    Jun. 21, 2018

(30) Foreign Application Priority Data
Dec. 19, 2016  (KR) .................. 10-2016-0173261

(51) Int. Cl.
| B60J 5/04 | (2006.01) |
| B21D 22/02 | (2006.01) |
| B21D 41/02 | (2006.01) |
| B21D 53/88 | (2006.01) |
| B21D 47/01 | (2006.01) |

(52) U.S. Cl.
CPC .......... *B60J 5/0458* (2013.01); *B21D 22/025* (2013.01); *B21D 41/02* (2013.01); *B21D 53/88* (2013.01); *B60J 5/0429* (2013.01); *B60J 5/0437* (2013.01); *B60J 5/0443* (2013.01); *B21D 47/01* (2013.01)

(58) Field of Classification Search
CPC ...... B21D 41/02; B21D 22/025; B21D 53/88; B21D 47/01; B60J 5/0443; B60J 5/0444
USPC ...................................................... 296/146.6
See application file for complete search history.

(56) References Cited

U.S. PATENT DOCUMENTS

| 5,392,024 | A | * | 2/1995 | Kiuchi | ................ | B60R 21/0136 |
| | | | | | | 280/735 |
| 5,466,032 | A | * | 11/1995 | Clausen | ................ | B60J 5/0444 |
| | | | | | | 296/146.6 |
| 5,544,930 | A | * | 8/1996 | Stedman | ................ | B60J 5/0437 |
| | | | | | | 296/146.6 |
| 5,755,484 | A | * | 5/1998 | Chou | .................... | B60J 5/0447 |
| | | | | | | 248/68.1 |

(Continued)

FOREIGN PATENT DOCUMENTS

| KR | 10-2007-0083258 A | 8/2007 | |
| KR | 10-2010-0048038 A | 5/2010 | |
| WO | WO-2015093069 A1 * | 6/2015 | ............ B60J 5/0443 |

*Primary Examiner* — Pinel E Romain
(74) *Attorney, Agent, or Firm* — Morgan, Lewis & Bockius LLP (57) ABSTRACT

A door impact beam that is disposed across a door frame of a vehicle and a method of manufacturing the door impact beam may include a body formed in a pipe shape and concaved on a side facing an external side of the vehicle; and coupling portions integrally extending from first and second end portions of the body to be coupled to the door frame through spot welding.

10 Claims, 7 Drawing Sheets

(56) References Cited

U.S. PATENT DOCUMENTS

| | | | | |
|---|---|---|---|---|
| 5,756,167 A * | 5/1998 | Tamura | ............... | B21C 37/0803 |
| | | | | 228/146 |
| 6,020,039 A * | 2/2000 | Cline | ................... | B60J 5/0444 |
| | | | | 296/146.6 |
| 6,039,387 A * | 3/2000 | Choi | ..................... | B60J 5/0427 |
| | | | | 296/146.6 |
| 6,364,398 B1 * | 4/2002 | Kim | ..................... | B60J 5/0443 |
| | | | | 296/146.6 |
| 6,591,577 B2 * | 7/2003 | Goto | ..................... | B60J 5/0444 |
| | | | | 138/115 |
| 6,722,037 B2 * | 4/2004 | Nees | .................... | B60J 5/0444 |
| | | | | 29/897.2 |
| 8,727,421 B2 * | 5/2014 | Cohoon | ................ | B60J 5/0425 |
| | | | | 296/146.6 |
| 9,809,091 B2 * | 11/2017 | Benson | ................... | B60J 5/0443 |
| 9,815,352 B2 * | 11/2017 | Roehm | .................. | B60J 5/0423 |
| 9,884,359 B2 * | 2/2018 | Peters | ................... | B21D 53/88 |
| 10,052,941 B2 * | 8/2018 | Mildner | ................ | B60J 5/0429 |
| 2004/0216387 A1 * | 11/2004 | Furuse | .................. | B60J 5/0405 |
| | | | | 49/502 |
| 2010/0196637 A1 * | 8/2010 | Lippert | ................ | B29C 70/345 |
| | | | | 428/36.1 |
| 2011/0308168 A1 * | 12/2011 | Yasuhara | ............ | B60J 5/0426 |
| | | | | 49/399 |
| 2012/0091750 A1 * | 4/2012 | Danaj | ................... | B60J 5/0437 |
| | | | | 296/146.6 |
| 2013/0033065 A1 * | 2/2013 | Johansson | ............... | B60J 5/042 |
| | | | | 296/146.6 |
| 2013/0140845 A1 * | 6/2013 | Jeon | ..................... | B60J 5/0455 |
| | | | | 296/146.6 |
| 2017/0029033 A1 * | 2/2017 | Kitaguchi | .............. | B60J 5/0443 |
| 2018/0208029 A1 * | 7/2018 | Tanaka | ................... | B60J 5/0443 |

* cited by examiner

DOOR IMPACT BEAM AND MANUFACTURING METHOD THEREOF

CROSS-REFERENCE(S) TO RELATED APPLICATIONS

The present application claims priority to Korean Patent Application No. 10-2016-0173261, filed Dec. 19, 2016, the entire contents of which is incorporated herein for all purposes by this reference.

BACKGROUND OF THE INVENTION

Field of the Invention

The present invention relates to a door impact beam and a manufacturing method thereof and, more particularly, to a door impact beam for supplementing the strength of an automotive door and a method of manufacturing the door impact beam.

Description of Related Art

Automotive doors are manufactured by coupling panels to both sides of door frames having empty compartments at the center portions, so door impact beams are disposed to supplement the strength for the empty compartments inside the door frames.

A door impact beam is plastically deformed by a load laterally applied to an automotive door, thereby absorbing impact energy and preventing a passenger from being injured.

Door impact beams are generally formed in hollow pipe shapes having a circular or elliptical cross-section, and brackets are used to connect both end portions of the door impact beams and a door frame.

Figure 1:
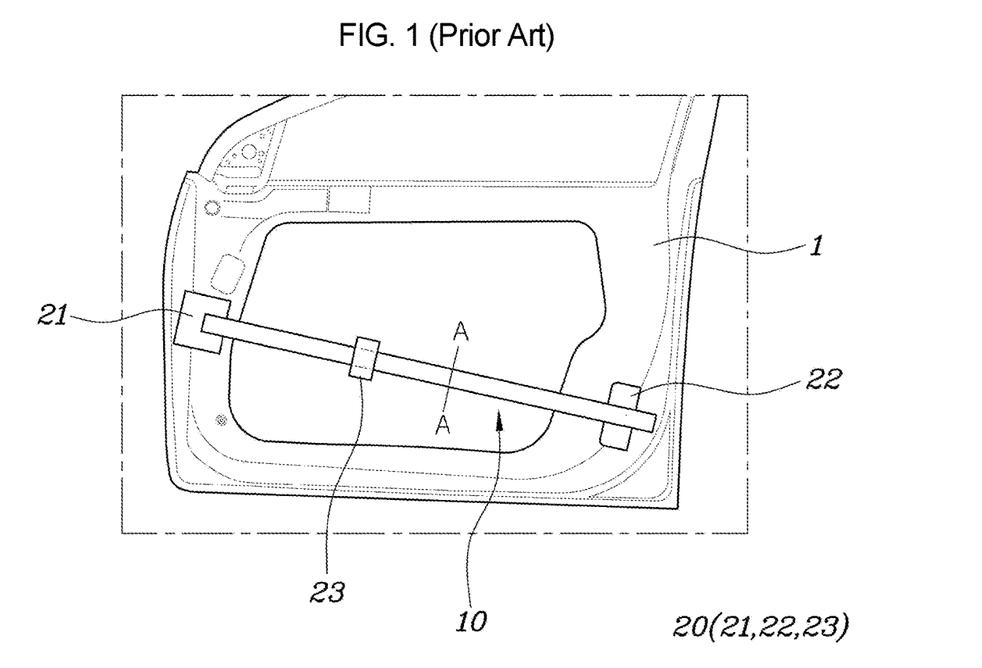
FIG. 1 is a view depicting a door impact beam of the prior art mounted on a door frame.
Figure 2:
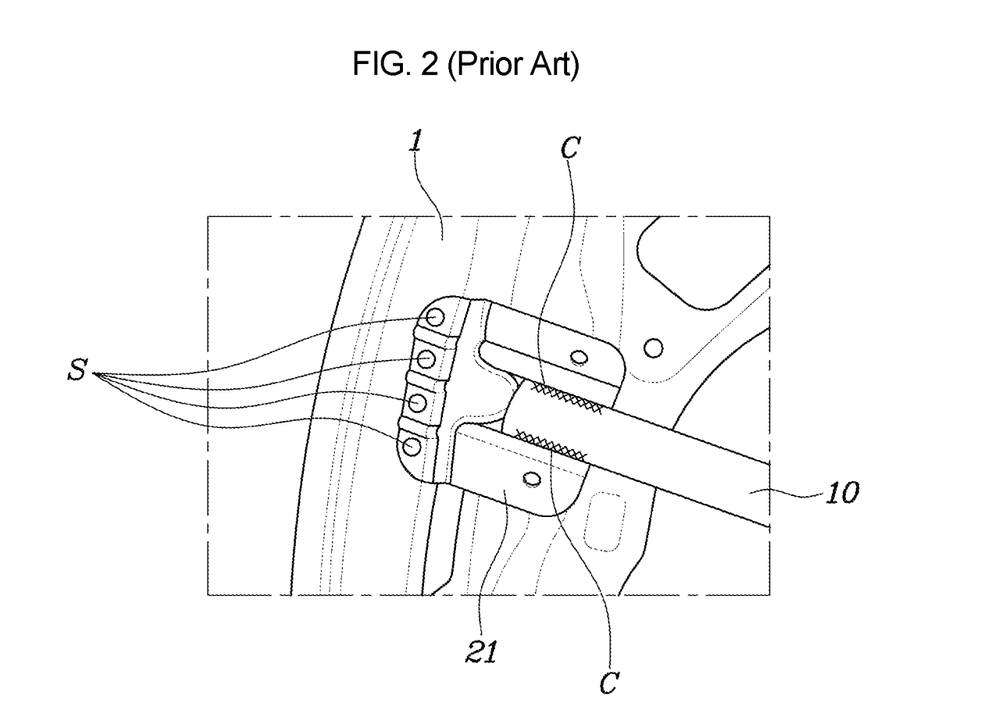
FIG. 2 is an enlarged view depicting a first end portion of the door impact beam of the prior art mounted on the door frame.
Figure 3:
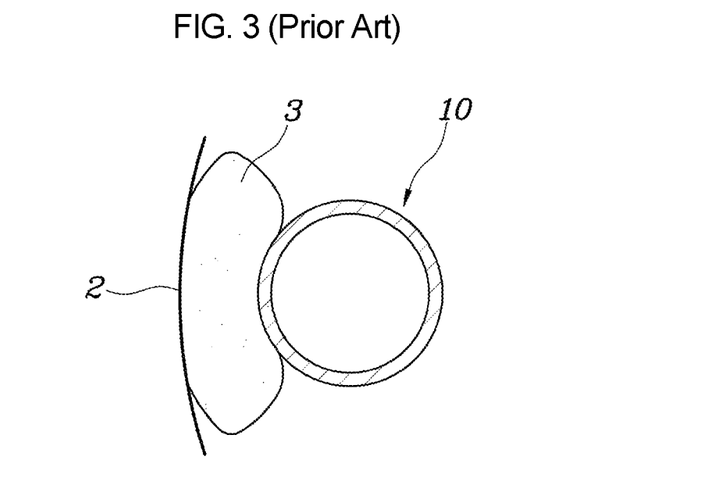
FIG. 3 is a cross-sectional view depicting the cross-sectional shape of the door impact beam of the prior art and a coupling relationship with an external panel.

FIG. 1 is a view depicting a coupling relationship between a door frame 1 and a door impact beam 10, FIG. 2 is an enlarged view depicting a joint between an end portion of the door impact beam 10 and the door frame 1, and FIG. 3 is a view depicting a coupling relationship among the door impact beam 10 cut along line A-A in FIG. 1, an external panel 2, and a sealer 3.

As shown in FIG. 1 to FIG. 3, a plurality of brackets 20 are coupled to the door impact beam 10 of the prior art. In detail, the door impact beam 10 is coupled to the door frame 1 through a first bracket 21 at a first end portion and a second bracket 22 at a second end portion, and the sealer 3 is prevented from separating out of the area between the external panel 2 and the door impact beam 10 by a third bracket 23.

That is, the third bracket 23 is disposed at the portion where the gap between the external panel 2 and the door impact beam 10 is large to decrease the gap so that the external panel 2 and the door impact beam 10 maintain a predetermined gap therebetween, preventing the sealer 3 from separating.

The door impact beam 10, the first bracket 21, the second bracket 22, and the third bracket 23 are coupled by $CO_2$ welding C and, the first bracket 21, the second bracket 22, and the door frame 1 are coupled by spot welding S.

However, when the door impact beam 10, the first bracket 21, the second bracket 22, and the third bracket 23 are coupled by $CO_2$ welding C, the strength at the welded portion of the door impact beam 10 is decreased by welding heat. In general, the door impact beam 10 requires strength of 1500 MPa or more, but the strength around the $CO_2$-welded portion of the door impact beam 100 is decreased to the level of 800 MPa, so breaking initiates from the welded portion in a side collision.

Further, when the cross-section of the door impact beam 10 is in the shape of a circle or an ellipse, the sealer 3 disposed between the door impact beam 10 and the external panel 2 is easily separated, so the external panel 2 is not firmly fixed.

Therefore, there is a need for a new door impact beam that can solve the problems of deterioration of strength at a welded portion and separation of a sealer and has a simple configuration without brackets.

The information disclosed in this Background of the Invention section is only for enhancement of understanding of the general background of the invention and should not be taken as an acknowledgement or any form of suggestion that this information forms the prior art already known to person skilled in the art.

BRIEF SUMMARY

Various aspects of the present invention are directed to providing a door impact beam that has an integral structure without a bracket and has a cross-sectional structure that can prevent separation of a sealer, and a method of manufacturing the door impact beam.

To achieve the objects of the present invention, a door impact beam that is disposed across a door frame of a vehicle may include a body formed in a pipe shape and concaved on a side facing the external side of the vehicle; and coupling portions integrally extending from both end portions of the body to be coupled to the door frame through spot welding.

The body may have a cross-section divided into a flat portion facing the internal of the vehicle, curved portions respectively extending toward the external side of the vehicle from both end portions of the flat section, and a sealer-fixing portion facing the external side of the vehicle, connecting end portions of the curved sections, and concaved toward the internal of the vehicle.

The sealer-fixing portion may prevent the separation of a sealer that is disposed between a door external panel of the vehicle and the body by providing an area in which the sealer can be inserted.

The coupling portions may be formed in a flat plate shape having a width larger than half of the circumference of the body by pressing the pipe shape of the body, and may be spot-welded to the door frame at several positions.

The coupling portions may have a width that is approximately 0.6 to 0.8 times the circumference of the body.

The coupling portions may include a first coupling portion formed at a first end portion of the body to be coupled to a portion of the door frame, and a second coupling portion formed at a second end portion of the body to be coupled to another portion of the door frame.

A method of manufacturing a door impact beam that is disposed on a door frame of a vehicle may include preparing a raw pipe having a circular cross-section with both end portions open; forming a secondary pipe having a larger diameter at both end portions than at the center portion by expanding both end portions of the raw pipe by inserting a punch into both end portions of the raw pipe; and pressing the secondary pipe to make both end portions of the secondary pipe flat, and make the center portion of the secondary pipe concaved in a predetermine direction.

In the forming of the secondary pipe, both end portions of the secondary pipe may be formed to have a diameter approximately 20% to 40% larger than the center portion.

In the forming of the secondary pipe, both end portions of the raw pipe may be expanded by sequentially inserting a plurality of punches having gradually increasing diameters into both end portions of the raw pipe.

In the forming of the secondary pipe, the diameter of both end portions of the raw pipe may be gradually increased by inserting a punch having a varying diameter into both end portions of the raw pipe and rotating the punch.

According to the door impact beam and the method of manufacturing the door impact beam of the present invention, the following effects can be achieved.

First, it is possible to simplify the entire configuration by removing brackets for fixing the door impact beam to a door frame.

Second, it is possible to prevent a local decrease in strength by removing $CO_2$-welded portions of brackets and the door impact beam.

Third, it is possible to prevent the separation of a sealer disposed between the door impact beam and an external panel.

Fourth, it is possible to reduce the number of necessary processes by simultaneously pressing the body and the coupling portions of the door impact beam.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustration of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is intended to cover not only the exemplary embodiments, but also various alternatives, modifications, equivalents and other embodiments, which may be included within the spirit and scope of the invention as defined by the appended claims.

Terminologies stated herein are used only for describing specific embodiments without limiting the present invention. The singular terms used herein include plural terms unless phrases express opposite meanings clearly. The term 'including' used herein refers to concrete specific characteristics, regions, positive numbers, steps, operation, elements and/or components, not limiting existence or addition of other specific characteristics, regions, positive numbers, steps, operation, elements and/or components.

Though not differently defined, all the terms, including technical terms and scientific terms used hereafter, have the same meanings as those that those skilled in the art understand. The terms defined in dictionaries should be construed as having meanings corresponding to the related prior art documents and those stated herein and not construed as being ideal or official, if not defined.

Hereinafter, a door impact beam according to an exemplary embodiment of the present invention and a method of manufacturing the door impact beam is described with reference to the accompanying drawings.

Figure 4:
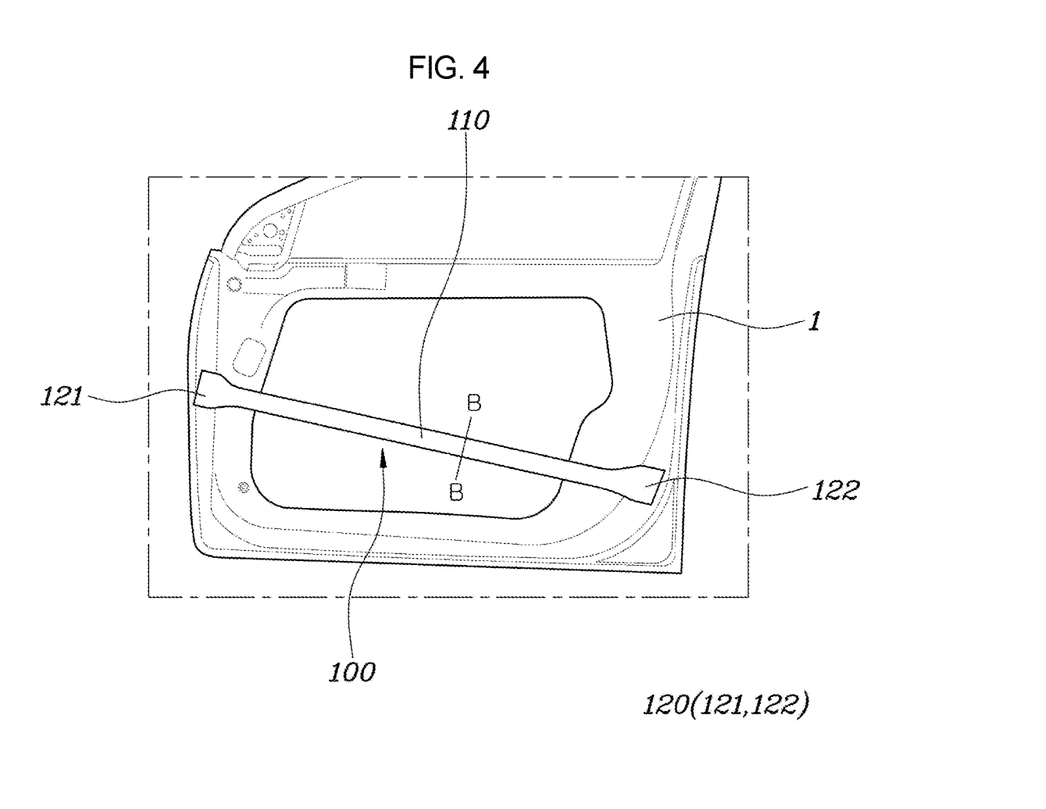
FIG. 4 is a view depicting a door impact beam according to an exemplary embodiment of the present invention mounted on a door frame.
Figure 5:
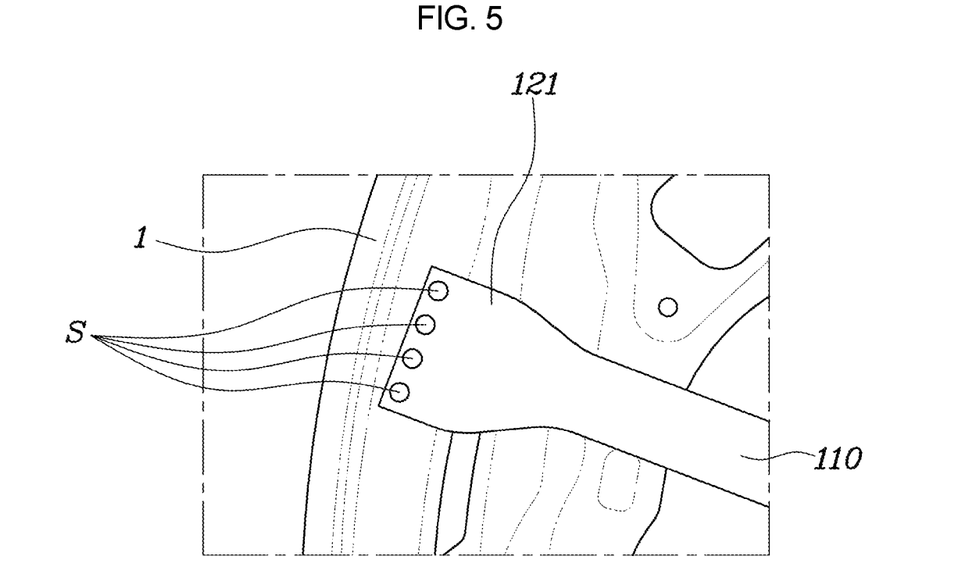
FIG. 5 is an enlarged view depicting a first end portion of the door impact beam according to an exemplary embodiment of the present invention mounted on the door frame.
Figure 6:
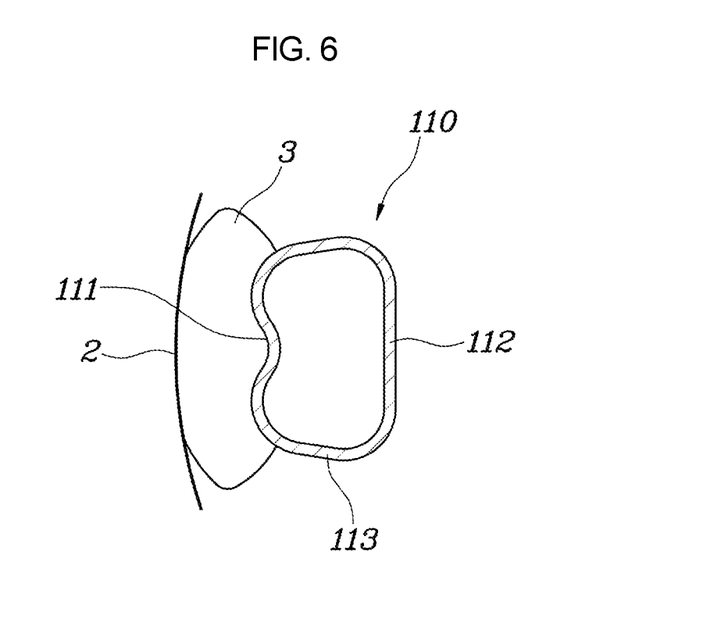
FIG. 6 is a cross-sectional view depicting the cross-sectional shape of the door impact beam according to an exemplary embodiment of the present invention and a coupling relationship with an external panel.

As shown in FIG. 4, FIG. 5, and FIG. 6, a door impact beam 100 according to an exemplary embodiment of the present invention is provided to supplement strength by being disposed across a door frame 1 of a vehicle.

The door impact beam 100 includes a pipe-shaped body 110 and coupling portions 120 integrally extending from both end portions of the body 110.

The body 110 is exemplary to be disposed across an empty area at the center of the door frame 1 and is concaved on the side facing the external side of a vehicle, that is, an external panel 2. That is, the cross-section of the body 110 includes a sealer-fixing portion 111 concaved inward, a flat portion 112 opposite to the sealer-fixing portion 111, and curved portions 113 formed between the sealer-fixing portion 111 and the flat portion 112.

A sealer 3 is disposed in the depression of the sealer-fixing portion 111, so the sealer 3 can separate the external panel 2 and the body 110.

The coupling portions 120 integrally extending from both end portions of the body 110 are formed by flattening the end portions of the pipe-shaped body 110.

That is, specific brackets would be coupled to both end portions of the body 110 by $CO_2$ welding and then fixed to the door frame 1 by spot welding in the prior art, but in an exemplary embodiment of the present invention the end portions of the body 110 are flattened into the coupling portions 120, and then the coupling portions 120 are directly fixed to the door frame 1 by spot welding.

The coupling portion 120 has a width that is larger than half the entire circumference of the body 110. The expected width when the body 110 is pressed is half the circumference of the body 110, so there is a need for a process of expanding the end portions of the pipe shape where the coupling portions 120 are formed to ensure the coupling portions 120 are larger than half of the circumference of the body 110. The present process will be described in detail in relation to the method of manufacturing the door impact beam of the present invention.

Forming the width of the coupling portions 120 larger than half of the circumference of the body 110 is for ensuring an area for spot-welding the coupling portions to the door frame 1 at several positions, preferably at four positions. When the width of the coupling portions 120 is small, spot welding to the door frame 1 at several positions is difficult and, accordingly, the coupling force may be decreased.

In detail, the coupling portions 120 may have a width that is approximately 0.6 to 0.8 times the circumference of the body 110. For example, when the diameter of the pipe shape of the body 110 is 35 to 45 mm, the reference circumference becomes approximately 110 to 141 mm. When the body 110 is intactly pressed the width becomes half of the circumference, that is, approximately 55 to 70 mm, but the necessary width for spot welding at four positions is 80 mm or more, so it is required to increase the width of the coupling portions 120 to 0.6 to 0.8 times the circumference of the body 110 to obtain the necessary width.

Figure 10:
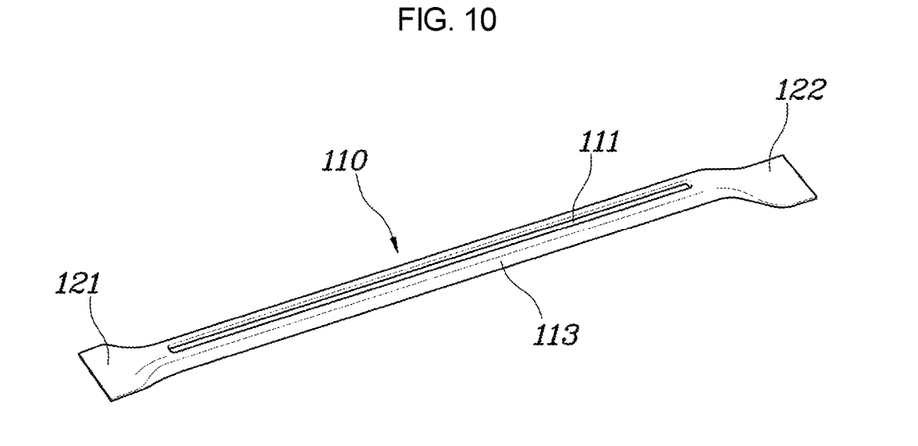
FIG. 10 is a perspective view of a completed door impact beam.

The coupling portions 120 are a first coupling portion 121 at a first end portion of the body 110 and a second coupling portion 122 at a second end portion of the body 110. The first coupling portion 121 and the second coupling portion 122 may have the same width, but the heights when the first coupling portion 121 and the second coupling portion 122 are pressed flat may be different, depending on the shape of the door frame 1 to which the coupling portions are coupled.

Figure 7:
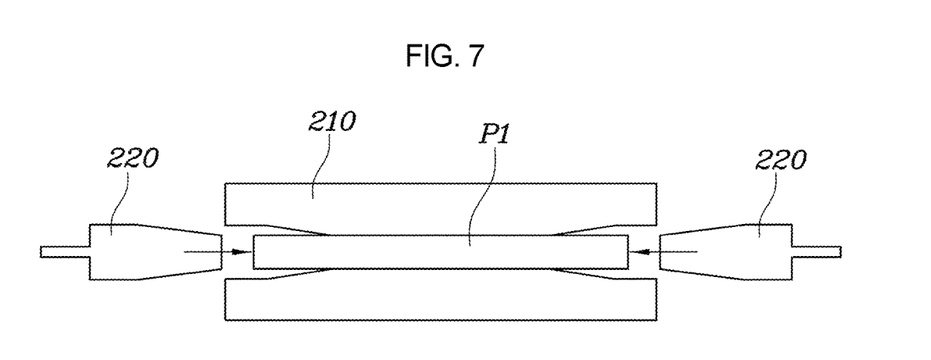
FIG. 7 is a schematic view depicting an expanding device for a door impact beam.
Figure 8:
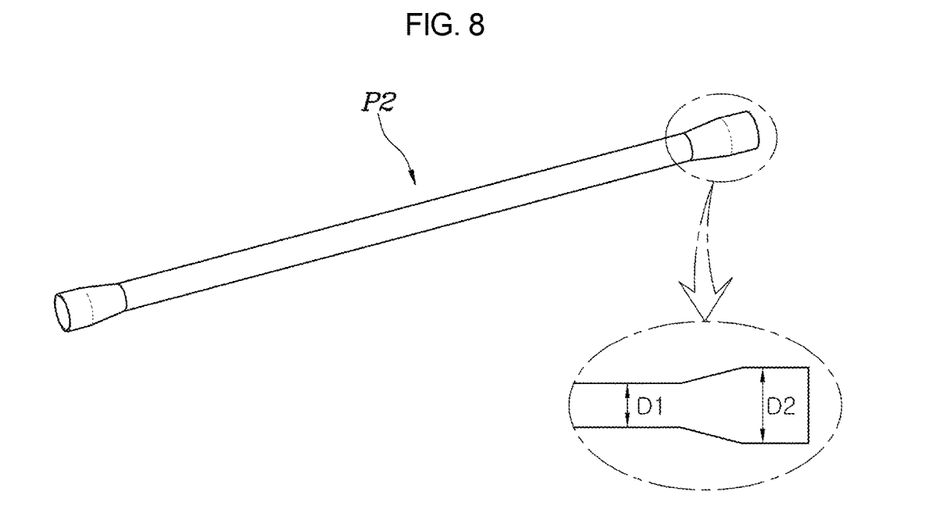
FIG. 8 is a perspective view depicting a door impact beam with both end portions expanded.
Figure 9:
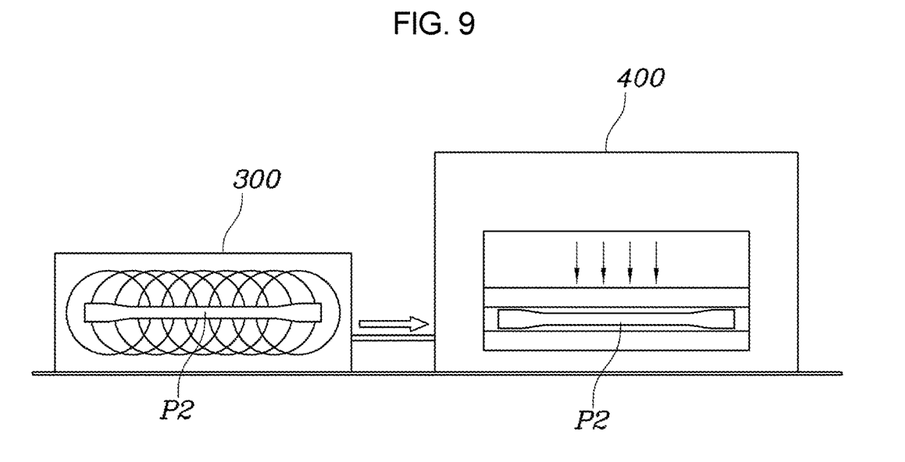
FIG. 9 is a schematic view of an apparatus for heating and pressing a door impact beam with both end portions expanded.
Figure 11:
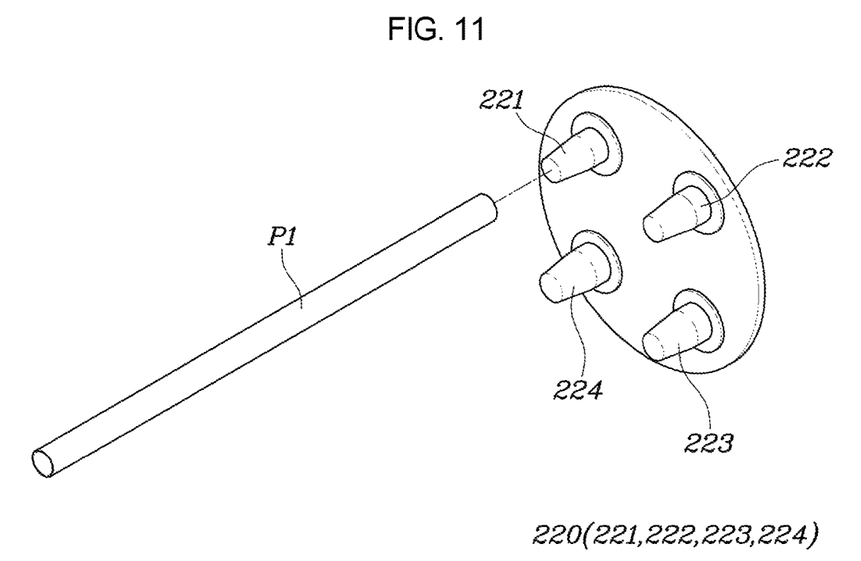
FIG. 11 is a view depicting an exemplary embodiment of an expanding device for a door impact beam.
Figure 12:
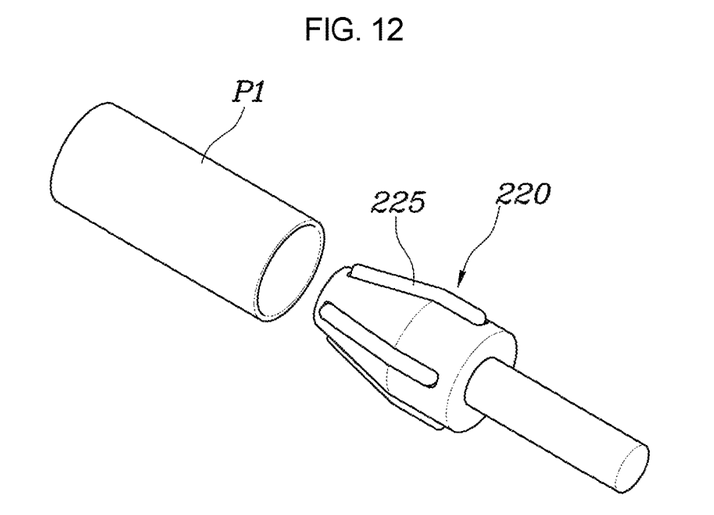
FIG. 12 is a view depicting another exemplary embodiment of an expanding device for a door impact beam.

A method of manufacturing the door impact beam of the present invention is described hereafter with reference to FIG. 7 to FIG. 12 which show an apparatus and devices for machining a door impact beam and door impact beams that are in intermediate processes. FIG. 7 is a schematic view of an expanding device for a door impact beam, FIG. 8 is a perspective view of a door impact beam with both end portions expanded, FIG. 9 is a schematic view of an apparatus for heating and pressing a door impact beam with both end portions expanded, FIG. 10 is a perspective view of a completed door impact beam, and FIG. 11 and FIG. 12 are views depicting embodiments of an expanding device for a door impact beam.

As shown in FIG. 7 to FIG. 12, a raw pipe P1 having a circular cross-section is prepared and machined into a secondary pipe P2 of which both end portions are expanded, and then the secondary pipe P2 is pressed wherein the center portion is concaved in a predetermine direction, manufacturing the door impact beam 100 having the coupling portions 120 at both end portions.

In detail, the raw pipe P1 is a common pipe having a circular cross-section and a longitudinally uniform shape.

The composition or properties of the raw pipe P1 are not limited, but the raw pipe P1 may include a material to which machining and strengthening can be simultaneously applied through hot press forming.

In a process of forming the secondary pipe P2, the raw pipe P1 is inserted into a mold 210, and then punches 220 are inserted into both end portions to increase the diameter at both end portions to be larger than at the center portion.

The center portion of the secondary pipe P2 has a diameter D1 the same as that of the raw pipe P1, and both end portions have a diameter D2 increased by approximately 20 to 40% relative to the center portion. The present process is for increasing the width of the coupling portions 120 larger than half of the circumference of the raw pipe P1 when forming the coupling portions 120 through pressing, in which the degree of expansion may be adjusted in consideration of the structure of the expanding device or the material and machining conditions of the raw pipe P1.

As an example of the expansion, it may be possible to expand an end portion of the raw pipe P1 in stages by inserting a plurality of punches of which the diameters are gradually increased. For example, when a frustoconical first punch 221 having an end portion with an external diameter smaller than the internal diameter of the raw pipe P1 is inserted into an end portion of the raw pipe P1 for primary expansion, and then a second punch 222, a third punch 223, and a fourth punch 224 that have external diameters sequentially larger than the first punch 221 are sequentially inserted into the end portion of the raw pipe P1, the end portion of the raw pipe P1 can be machined in the same shape as the fourth punch 224.

Using sequential punches for expansion is for distributing impact due to the machining, because the end portion of the pipe may be cracked or broken when it is expanded in one step. The increasing amount of the diameter by each punches is not limited, but it may be possible to increase the diameter by approximately 7~10% in each step to prevent breakage during machining.

As another example of the expansion, it may be possible to use machining fins 225 protruding around the external surface of the punch 220.

That is, by inserting the punch 220 into the raw pipe P1 when the diameter of the punch 220 is the smallest with the machining fins 225 hidden in grooves in the punch 220 and then gradually protruding the machining fins 225 while the punch 220 is rotated, the end portion of the raw pipe P1 is expanded, so the secondary pipe P2 is obtained.

After being formed, the secondary pipe P2 is heated in a furnace 300 and then undergoes hot press forming through a press 400, whereby, finally the resultant door impact beam 100 is manufactured. In the present process, the center portion of the secondary pipe P2 is machined to have a cross-section divided into the sealer portion 111, the flat portion 112, and the curved portions 113 and both end portions are pressed flat to form the coupling portions 120, whereby the door impact beam 110 is achieved.

Thereafter, the first coupling portion 121 and the second coupling portion 122 of the door impact beam 100 are coupled to the door frame 1 through spot welding, reinforcing the door frame 1.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of manufacturing a door impact beam that is disposed on a door frame of a vehicle, the method comprising:
   preparing a raw pipe having a circular cross-section with first and second end portions open;
   forming a secondary pipe having a larger diameter at first and second end portions than at a center portion by expanding the first and second end portions of the raw pipe by inserting a punch into the first and second end portions of the raw pipe; and
   pressing the secondary pipe to make the first and second end portions of the secondary pipe flat and make the center portion of the secondary pipe concaved in a predetermine direction.

2. The method of claim 1, wherein in the forming of the secondary pipe, the first and second end portions of the secondary pipe are formed to have a diameter larger by 20 to 40% than the center portion.

3. The method of claim 1, wherein in the forming of the secondary pipe, the first and second end portions of the raw pipe are expanded in stages by sequentially inserting a plurality of punches having increasing diameters into the first and second end portions of the raw pipe.

4. The method of claim 1, wherein in the forming of the secondary pipe, a diameter of the first and second end portions of the raw pipe is increased by inserting a punch having a varying diameter into the first and second end portions of the raw pipe and rotating the punch.

5. The door impact beam that is disposed across the door frame of the vehicle according to the method of claim 1, the door impact beam comprising:
   a body formed in a pipe shape and concaved on a side facing an external side of the vehicle; and
   coupling portions integrally extending from first and second end portions of the body to be coupled to the door frame through spot welding.

6. The door impact beam of claim 5,
   wherein the body has a cross-section divided into a flat portion facing an internal of the vehicle, a pair of curved portions respectively extending toward the external side of the vehicle from first and second end portions of the flat portion, and a sealer-fixing portion facing the external side of the vehicle, connecting end portions of the curved sections, and concaved toward the internal of the vehicle.

7. The door impact beam of claim 6,
   wherein the sealer-fixing portion is configured to prevent separation of a sealer that is disposed between a door external panel of the vehicle and the body by providing a predetermined area in which the sealer is configured to be inserted.

8. The door impact beam of claim 5,
   wherein the coupling portions are formed in a flat plate shape having a width larger than half of a circumference of the body by pressing the pipe shape of the body, and are spot-welded to the door frame at predetermined positions.

9. The door impact beam of claim 8, wherein the coupling portions have a width that is 0.6 to 0.8 times the circumference of the body.

10. The door impact beam of claim 8,
    wherein the coupling portions include a first coupling portion formed at the first end portion of the body to be coupled to a first portion of the door frame and a second coupling portion formed at the second end portion of the body to be coupled to a second portion of the door frame.

* * * * *